United States Patent [19]
Bishop et al.

[11] Patent Number: 5,328,309
[45] Date of Patent: Jul. 12, 1994

[54] SLOTTING MACHINES

[75] Inventors: Arthur E. Bishop, Greenwich; David W. Scott, Ruse, both of Australia

[73] Assignee: A E Bishop & Associates Pty Limited, North Ryde, Australia

[21] Appl. No.: 50,329

[22] Filed: Aug. 6, 1993

[30] Foreign Application Priority Data

Nov. 23, 1990 [AU] Australia .............................. PK3520

[51] Int. Cl.⁵ .............................................. B23D 5/00
[52] U.S. Cl. ...................................... 409/307; 409/334
[58] Field of Search ............... 409/304, 305, 307, 289, 409/292, 296, 291, 334, 326, 330, 331

[56] References Cited

U.S. PATENT DOCUMENTS

| | | | |
|---|---|---|---|
| 2,532,591 | 12/1950 | Armitage et al. | 409/334 |
| 3,765,305 | 10/1973 | Bishop | 409/305 |
| 4,154,145 | 5/1979 | Bishop | 409/307 |
| 4,488,841 | 12/1984 | Brown | 409/292 |
| 4,978,263 | 12/1990 | Sheppard | 409/307 |

FOREIGN PATENT DOCUMENTS

994159 2/1983 U.S.S.R. ............................. 409/307

Primary Examiner—William Briggs
Attorney, Agent, or Firm—Nikaido, Marmelstein, Murray & Oram

[57] ABSTRACT

A machine for machining blind-ended slots longitudinally disposed within the bore of a sleeve (1) held in a chuck (4) in a work holding spindle (5) indexable about a rotational axis, a reciprocable cutting tool (2) mounted on a cutting spindle (12) the axis of which is offset from and at right angles to the rotational axis of the work holding spindle (5) in which the cutting tool (2) executes a succession of progressively deeper cutting and subsequent return strokes so that a number of blind-ended slots are machined in the sleeve (1) characterized in the provision of a slidable support (6) for the work holding spindle (5) to slide the work holding spindle (5) axially relative to the cutting spindle (12) a distance such that the cutting tool is radially and axially clear of the bore when all slots are machined, cutting strokes of the cutter being discontinued.

5 Claims, 6 Drawing Sheets

SLOTTING MACHINES

The invention relates to a widely used component of an automotive power steering valve known as the sleeve, which has arranged inside the bore a plurality of parallel longitudinally extending, circumferentially spaced ports in the form of slots. These slots are blind-ended thus forming a series of closed chambers within the bore of the sleeve which operate in conjunction with similar circumferentially spaced ports in a co-acting cylindrical valve rotor component housed within the sleeve upon slight relative rotation between these components.

Such sleeves are frequently manufactured by broaching the bore of a turned blank so as to form a series of slots therein. Subsequently each end of the sleeve is counterbored for a short distance and close-fitting stop rings are inserted to form a closed chamber within the sleeve. Alternatively after broaching the turned blank, the ends are closed by cold-forming the material of the sleeves each end, and the excess deformed material is later removed by remachining the bore.

Still another, but less widely used, construction calls for each of the slots to be scooped out of the bore of a turned blank by a finger-like tool supported in a spindle for angular reciprocation, the tool having a cutting edge which executes a series of progressively deeper cutting strokes so forming a blind-ended slot which is arcuate in longitudinal section. This process is repeated for all of the required slots, usually 4, 6 or 8 slots for most automotive applications. A specialized machine capable of performing this operation was first disclosed in U.S. Pat. No. 3,765,305. As can be seen from FIGS. 13 and 14 of that specification, the depth of material removed during one cutting stroke of this machine is approximately constant during the duration of each cutting stroke, leading in turn to a uniform chip thickness and therefore an optimum cutting geometry. However, at the completion of the slotting operation, the machine is necessarily stopped and the work holding chuck is swivelled sideways to allow unloading and loading of the next sleeve blank. To enable this to occur the locus of the tool tip during each cutting stroke is required to extend axially clear of the bore. This overstroking requirement increased the inertial imbalance of the machine and hence slowed its operation to such a degree that the design was abandoned.

In U.S. Pat. No. 4,154,145 a more refined design of slotting machine is disclosed capable of overcoming the aforementioned limitations. Machines of this design have been used for several years however, as described in that specification, loading and unloading of the work holding chuck requires the mechanism to be stopped in a very precise position. In order to accomplish this, an electric brake and separate electric motor is provided to move the mechanism slowly to the required precise position. A stop 41, as shown in FIG. 2 of that specification, is then removed and a bell crank mechanism is folded by the action of an air cylinder (not shown) in order to swing the tool holder clear of the workpiece. In order to accomplish this motion without the tool holder interfering with the top of the sleeve bore diametrically opposite to the slot being cut, the line joining the center 8 of the cutting spindle 7 and the center 10 of the cutting spindle carrier 9 will generally need to be even more nearly horizontally disposed than shown in FIG. 2, whereas, desirably this line should be vertical, as in the case of the slotting machine disclosed in U.S. Pat. No. 3,765,305. This enforced compromise results in the depth of material removed during each cutting stroke being up to three times greater at the end of the stroke compared with the start of the stroke, whereas, desirably, this depth of cut should be uniform. The resulting chip is therefore relatively thin as the cutting tool enters material in the sleeve bore and thicker as it exits the material. Such a cutting geometry is well recognized as suboptimal in other areas of metal machining. For example in the case of milling machines, "climb milling" is frequently employed to avoid the progressively thicker chip formed by each tooth of the milling cutter during "conventional" milling.

Wider adoption of that slotting machine has been further hindered by the concern of potential users of the process over the use of a single cutting edge to machine all the slots in the sleeve as compared to the several hundred cutting edges of the broach in the conventionally-used broaching method. This limitation is further exacerbated by the need to employ a finger-like cutting tool of a shape dictated by the need to swing the tool clear of the bore for loading and unloading of the work holding chuck. This demanded the use of a cutting tool having a tungsten carbide tip brazed to its shank, or in the case of larger diameter sleeves, a single cutting edge special tungsten carbide tip of the throw-away type was used. Neither arrangement is satisfactory, particularly for machining small-bore-diameter sleeves which are increasingly coming into use.

Now the standard tungsten carbide throw-away tips available in the industry used for machining grooves are generally of an equilateral triangular form providing three cutting edges and conforming to internationally accepted dimensional standards. Such tools are available in many grades of tungsten carbide and ceramic material, frequently Titanium Nitride (TiN) coated, and their use will make possible the employment of the slotting process for large volume sleeve production. However such standard tips, of a width corresponding to a typical sleeve slot width for a given bore diameter, are excessively large in size compared with such a bore diameter and therefore cannot be accommodated in a tool holder of the type disclosed in U.S. Pat. No. 4,154,145. This is because of the aforesaid limitation imposed by the need to retract the tool holder in an arcuate manner during unloading and loading operations.

According to the present invention the work holding chuck is contained in a work holding spindle and, at the moment when the tool is radially clear of the sleeve bore, the work holding spindle slides along its axis a sufficient distance to allow the sleeve to be removed from the work holding chuck without any interference with the tool holder. Consequently, the reciprocation of the tool may continue during the load/unload cycle and only infeeding of the tool and indexing of the work holding spindle need be momentarily arrested. Since, in a relative sense, the tool holder now retracts axially relative to the workpiece rather than arcuately as in the case of the slotting machine disclosed in U.S. Pat. No 4,154,145, a tool holder geometry compatible with standard tungsten carbide throw-away tips can now be employed to machine even small bore sleeves, greatly reducing the operating cost of such machines for large volume sleeve production. The absence of the need for arcuate retraction of the tool holder also permits the aforementioned optimum cutting geometry to be achieved, in which the depth of material removed during one cutting stroke of this machine is approximately constant throughout the duration of each cutting stroke.

The present invention consists in a machine for machining blind-ended slots longitudinally disposed within the bore of a sleeve, comprising a work holding spindle indexable about a rotational axis, said spindle incorporating a work holding chuck for holding said sleeve, a cutting tool mounted on a cutting spindle, the axis of said cutting spindle being offset from and at right angles to the rotational axis of said work holding spindle, means of supporting said cutting spindle for angular reciprocation, infeed means to permit said cutting tool to execute a succession of progressively deeper cutting and subsequent return strokes in relation to said bore of said sleeve, whereby after a series of indexations of said work holding spindle, said blind-ended slots are machined in a sleeve characterized in the provision of means slideably supporting said work holding spindle for movement along an axis parallel to said rotational axis of said work holding spindle and, means acting to disable said infeed means after said machining of all said slots is completed, and means to slide said work holding spindle axially relative to said cutting spindle a distance such that said cutting tool is radially and axially clear of said bore.

It is preferred that, after the cutting tool is radially and axially clear of the bore, additional relative movement between the work holding spindle and the cutting spindle enables axial extraction of the sleeve out of the work holding chuck without interference with the still-reciprocating cutting tool. The sleeve can then be transported laterally to a loading station and hence to a conveyor belt etc.

It is also preferred that the axial slideability of the work holding spindle is achieved by journalling this work holding spindle for rotation within a sliding work spindle carrier which, in turn, is able to slide axially with respect to the machine frame. It is also possible, however, that rotation and axial slideability of the work holding spindle could be achieved by directly plain-journalling this element in the machine frame. A linear ball race could also be employed to achieve these two motions.

The sliding work spindle carrier in this embodiment is driven up into the cutting position and down into the loading position by a rise and fall cam mechanism. It is preferred that in the upper cutting position, a conical surface on the exterior of the sliding spindle carrier forcibly engages a corresponding conical socket in the machine base providing rigid and accurate concentric location of the work holding spindle during the cutting cycle throughout the life of the machine.

Desirably, a loading mechanism is arranged to be driven up and down with the sliding work spindle carrier along an axis parallel to that of the sliding work spindle carrier but offset therefrom and is equipped with a pair of grippers which hold the sleeve on the short section of its outside diameter which protrudes from the work holding chuck. In a preferred arrangement, as the sliding work spindle carrier commences to descend, the work holding chuck therein is relaxed and shortly thereafter the loading mechanism is arrested while the sliding work spindle carrier continues to descend. By this means the sleeve is extracted from the work holding chuck, yet clear of the lower excursion of the reciprocating tool, and can be swung in a horizontal plane clear of the work holding chuck to a loading station where the finished sleeve component is removed from the grippers and a new component is inserted. Preferably the loading mechanism is equipped with two grippers, and is indexable to one half turn about a vertical axis. By this means no time is lost during the operation of the machine due to loading and unloading of the gripper. Note that the grippers are merely relaxed during the cutting operation and indexing of the sleeve, thereby avoiding the extra time-consuming movements which would be needed to move them away from the zone of cutting prior to cutting commencing, and back again on completion of cutting the slots.

Different aspects of a preferred form of the invention will now be described by way of example with reference to the accompanying drawings, in which.

Figure 1:
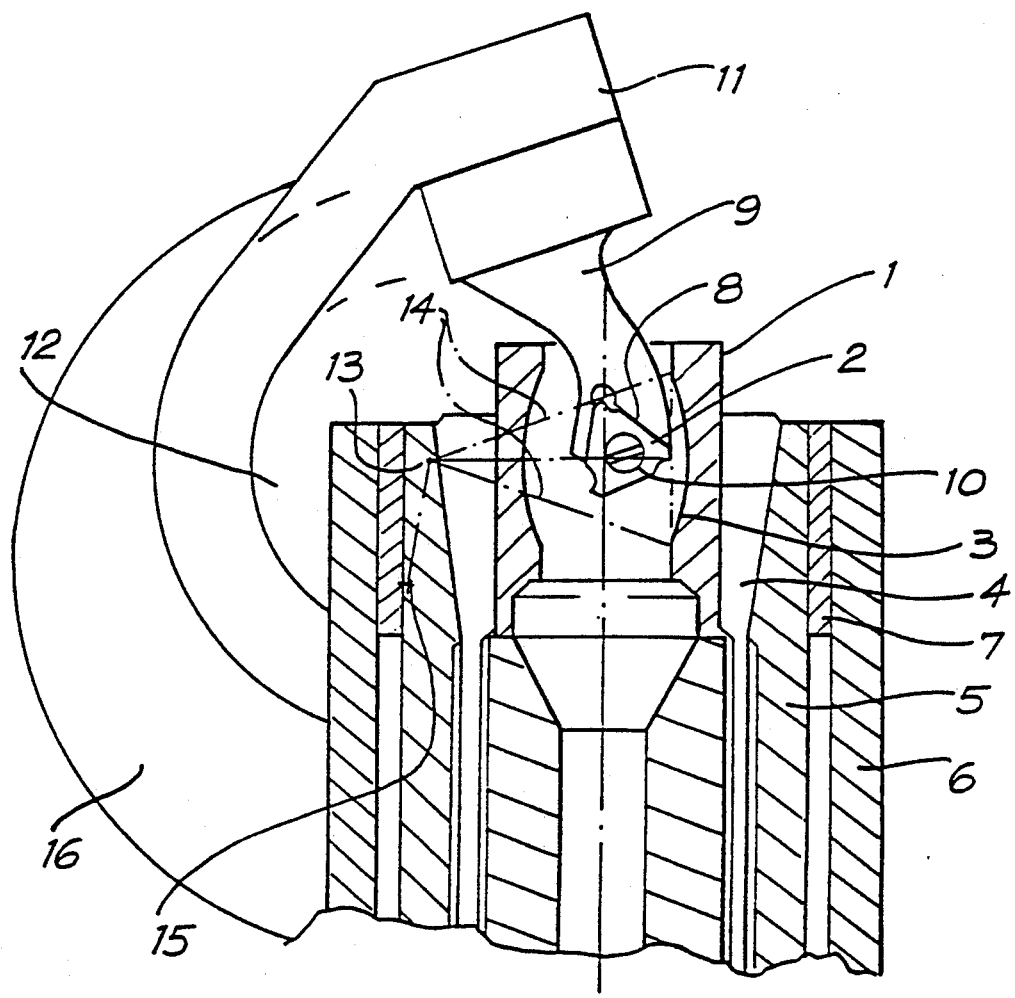
FIG. 1 is a cross section through the work holding portion of a slotting machine of the present invention in a vertical plane containing the sliding work spindle carrier, at the instant the cutting tool is at the mid-position during its last return stroke.

FIG. 1 shows sleeve 1 in its relation to cutting tool 2 at the instant of its mid-position during its last return stroke, that is after completing cutting of the last slot 3 in sleeve 1. Sleeve 1 is secured in work holding chuck 4 contained in work holding spindle 5, in turn rotatably journalled within axially sliding work spindle carrier 6 by bearing 7.

Cutting tool 2 is of the triangular throw-away insert type, and is appropriately housed in a precise pocket or recess 8 in tool holder 9 by retaining screw 10. Tool holder 9 is secured to cutting head 11 of cutting spindle 12 which angularly oscillates about axis 13, through an angle indicated by the chain-dotted lines 14. Axis 13 in fact is not a fixed axis but itself angularly oscillates about axis 15 of cutting spindle carrier 16 to enable infeeding of the cutting tool during cutting of a given slot. The detailed mechanics of this machine will be described in further detail later.

According to the disclosure in U.S. Pat. No. 4,154,145 unloading of the sleeve after completion of slotting is accomplished by removal of a stop (shown as item 41 in FIG. 2 of that patent) and rotation of the cutting spindle carrier (shown as item 9) through an angle of approximately 90 degrees clockwise from the position shown, causing the cutting tool to retract upwards and rightwards in a complex path determined by the kinematics of the mechanism. This is only possible when the disposition of the axis of cutting spindle (shown as item 8) relative to the axis of the cutting spindle carrier (shown as item 10) forms a line inclined at approximately 50 degrees to the horizontal, as shown in FIG. 3 of that specification. Even so, a finger like cutting tool as shown in this figure must be used in order to avoid interference between the cutting tool and the sleeve during retraction, precluding the use of a practical throw-away cutting tool insert or the use of an optimum load path.

Figure 2:
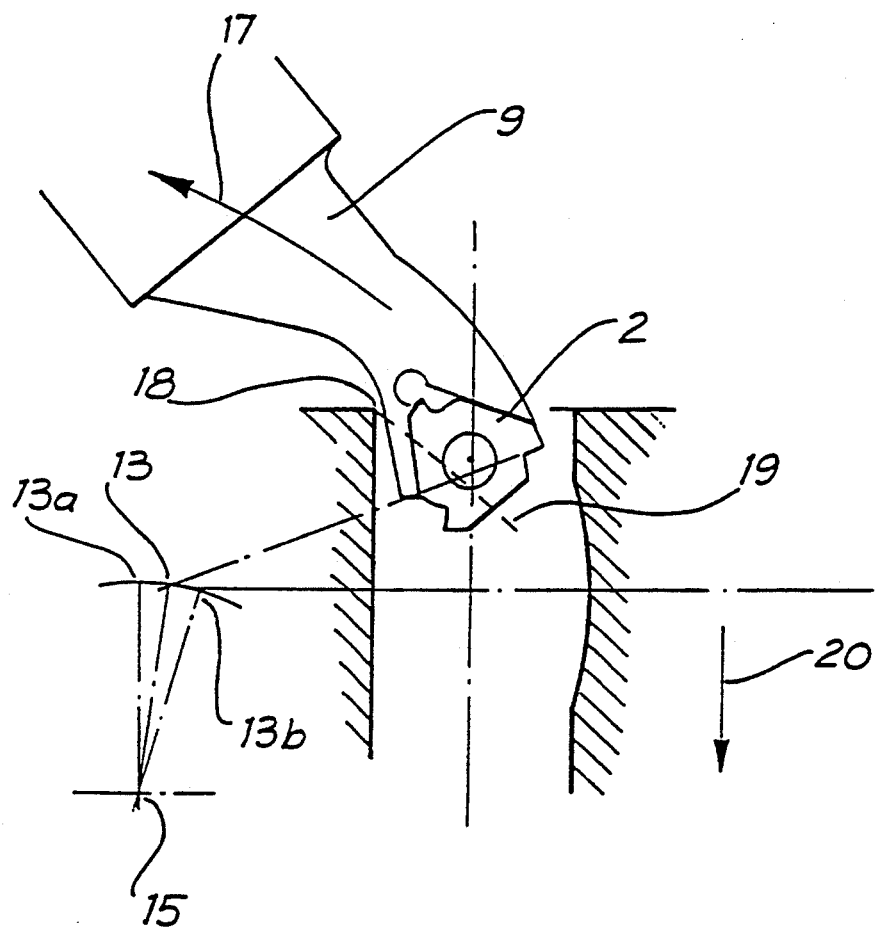
FIG. 2 is a vertical cross section of the sliding work spindle carrier of FIG. 1 showing details of the cutting geometry.
Figure 3:
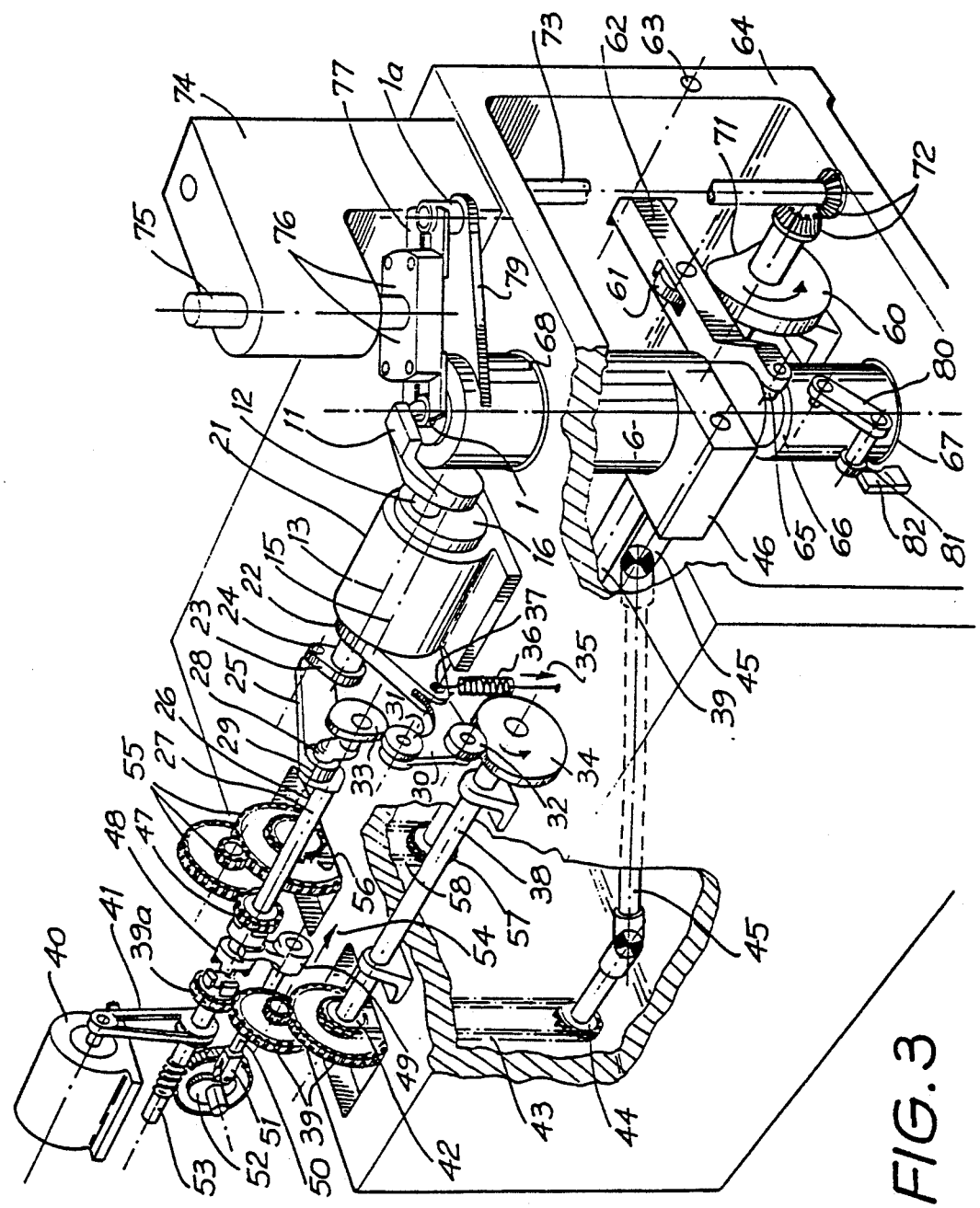
FIG. 3 is a sectional isometric view of a slotting machine in accordance with the present invention.

Now referring to FIG. 2 of this specification. If the nearly vertical disposition of the line joining axes 15 and 13 were used to improve the cutting geometry as described above, and if the cutting tool reciprocation were stopped at the position shown and tool holder 9 and cutting tool 2 retracted in direction 17 according to the methodology disclosed in U.S. Pat. No. 4,154,145, an interference with corner 18 of the bore of sleeve 1 would occur to the extent indicated by dotted line 19, making the use of a practical throw-away cutting insert impossible. On the other hand, according to the present invention, whilst the cutting tool continues to reciprocate, sliding work spindle carrier 6 is caused to descend in direction 20, carrying sleeve 1 axially clear of cutting tool 2 so that the envelope of its movement lies entirely within the confines of the cylindrical bore of sleeve 1 and therefore avoids any such interference.

Referring now to FIG. 3, which shows a general arrangement of a slotting machine conforming to the present invention, the operation of the cutting mechanism is similar in certain aspects to that shown in U.S. Pat. No. 4,154,145. Cutting spindle 12 is arranged to oscillate about axis 13 in cutting spindle carrier 16 this, in turn, being journalled to angularly oscillate about axis 15 in head stock 21. Note that axis 13 of cutting spindle 12 is located substantially vertically above axis 15 of cutting spindle carrier 16 rather than obliquely above. Angular oscillation of cutting spindle carrier 16 is imparted by lever 22 and causes axis 13 to move between extreme positions 13a and 13b (refer to FIG. 2) in a manner which will now be described.

Angular oscillation of cutting spindle 12 is imparted by lever 23 secured thereto, crank pin 24 and the connecting rod 25. Typically, cutting spindle 12 oscillates through an angle of about 40 degrees whereas cutting spindle carrier 16 oscillates through an angle of about 10 degrees.

Connecting rod 25 is driven by main shaft 26 which rotates about axis 27 in journals provided on machine frame 64 and is provided with a "cranked" section as at crank 28. The offset of crank 28 given by the displacement between the axes 27 and 29, is such as to impart the desired angle of oscillation to cutting spindle 12.

Bell crank 30 carries roller followers 31 and 32 which engage cams 33 and 34 respectively, and are urged into contact therewith by reactions resulting from the application of a force applied in direction 35 by spring 36. Spring 36 is arranged to act on the extended end of pin 37, pivotally connecting bell crank 30 and lever 22. The lower end of spring 36 is anchored to machine frame 64.

Thus bell crank 30 moves in space under the action of the two cams 33 and 34 whose output is effectively "added" to impart the required angular oscillation to cutting spindle carrier 16 via lever 22.

Cam 33 is mounted on main shaft 26 and has a constant radius about axis 27 for about half its periphery and has a semi-elliptical section providing a reduced radius over the other half of its periphery. Cam 33 provides infeed of cutting tool 2 during the portion of the cutting stroke when metal is being removed and relief of cutting tool 2 during the return portion of the cutting stroke. The infeed and relief action of cam 33 is more fully described in U.S. Pat. No. 4,154,145.

Cam 34 is mounted on shaft 38 supported on journals on machine frame 64 and rotates in the direction shown.

This cam is formed as a spiral scroll over three quarters of its periphery, with a reduced radius section over the other quarter, and provides the progressive infeed necessary over a series of cutting strokes to fully machine a given slot 3 in sleeve 1.

This infeeding action of cam 34 is more fully described in U.S. Pat. No. 4,154,145. In the position shown, cam 34 had just caused roller follower 32 to rise to the top of its travel, corresponding to the maximum cutting depth of cutting tool 2, and descend therefrom to the rest at the abovementioned reduced radius section. When roller follower 32 contacts cam 34 at this reduced radius section, the infeed position of cutting tool 2 corresponds to that shown in FIG. 1.

Cam 34 is driven by reduction gearing 39 from main shaft 26 by pinion 39a which rotates in the same direction as shaft 38. Main shaft 26 rotates continuously under the action of motor 40 and driving belt and pulley 41.

Shaft 38 carries sprocket 42 which drives through chain 43, sprocket 44 and thence, via universally jointed shaft 45 index mechanism 46. This index mechanism is of conventional form and serves to rotationally index sleeve 1 for the cutting of successive slots.

Pinion 39a is journalled on, but axially constrained with respect to main shaft 26. Pinion 39a has dog clutch teeth formed on the near face thereof, and pinion 47 is similarly journalled and constrained, but has dog clutch teeth formed on the far face thereof. Clutch member 48 is slideably keyed to main shaft 26 and is axially shifted along main shaft 26 by yoke 49, and has dog clutch teeth formed at each end thereof. Yoke 49 is carried on shaft 50 which is caused to slide axially through the action of follower 51 and lobed cam 52 rotated by worm gearing 53 from main shaft 26.

In the position shown in FIG. 3, clutch member 48 had just completed an axial shift in the direction shown by arrow 54 through the action of lobe cam 52 so disengaging clutch member 48 from pinion 39a and engaging it with pinion 47, whereupon cam 34 and index mechanism 46 stop rotating, and cutting tool 2 continues to execute the path shown in FIG. 1 clear of the bore of sleeve 1.

The loading cycle of the machine is now ready to commence. Pinion 47, through reduction gearing 55 and sprockets 56 and 57 and chain 58 now drives shaft 59 and rise and fall cam 60 in the direction shown.

Cam follower 61 is journalled in lever 62 which is pivoted about axis 63 in machine frame 64. Lever 62 is extended to form a yoke having rollers 65 engaging a groove 66 in sliding work spindle carrier 6, slideably journalled in machine frame 64 in bearing 67 at its lower end and bearing 68 at its upper end (see also FIG. 4).

Sliding work spindle carrier 6 incorporates a conical face 69 which, at the instant shown, is forced upwardly into conical recess 70 in bearing 68 through the action of lever 62, cam 60 and cam follower 61. Immediately upon the loading cycle commencing, cam 60 rotates in the direction shown and the cut-away section 71 of cam 60 allows sliding work spindle carrier 6 to commence to descend. At the same instant shaft 59 drives, through bevel gears 72, shaft 73 leading to loading device 74 in which is journalled, both slideably and rotatably, shaft 75 carrying at its lower end loader arms 76.

Loader arms 76 are equipped with grippers 77 which are actuated to open and close upon sleeve 1 held in work holding chuck 4 and upon the next sleeve to be machined 1a supported on loading station comprising platform 78 which forms a protrusion on integral extension 79 of sliding work spindle carrier 6.

The mechanism within the loading device 74 comprises conventional machine elements which cause, upon rotation of shaft 73, the axial sliding and successive half-turn rotations of shaft 75, and the opening and closing of grippers 77 in the appropriate sequence now described.

Figure 4:
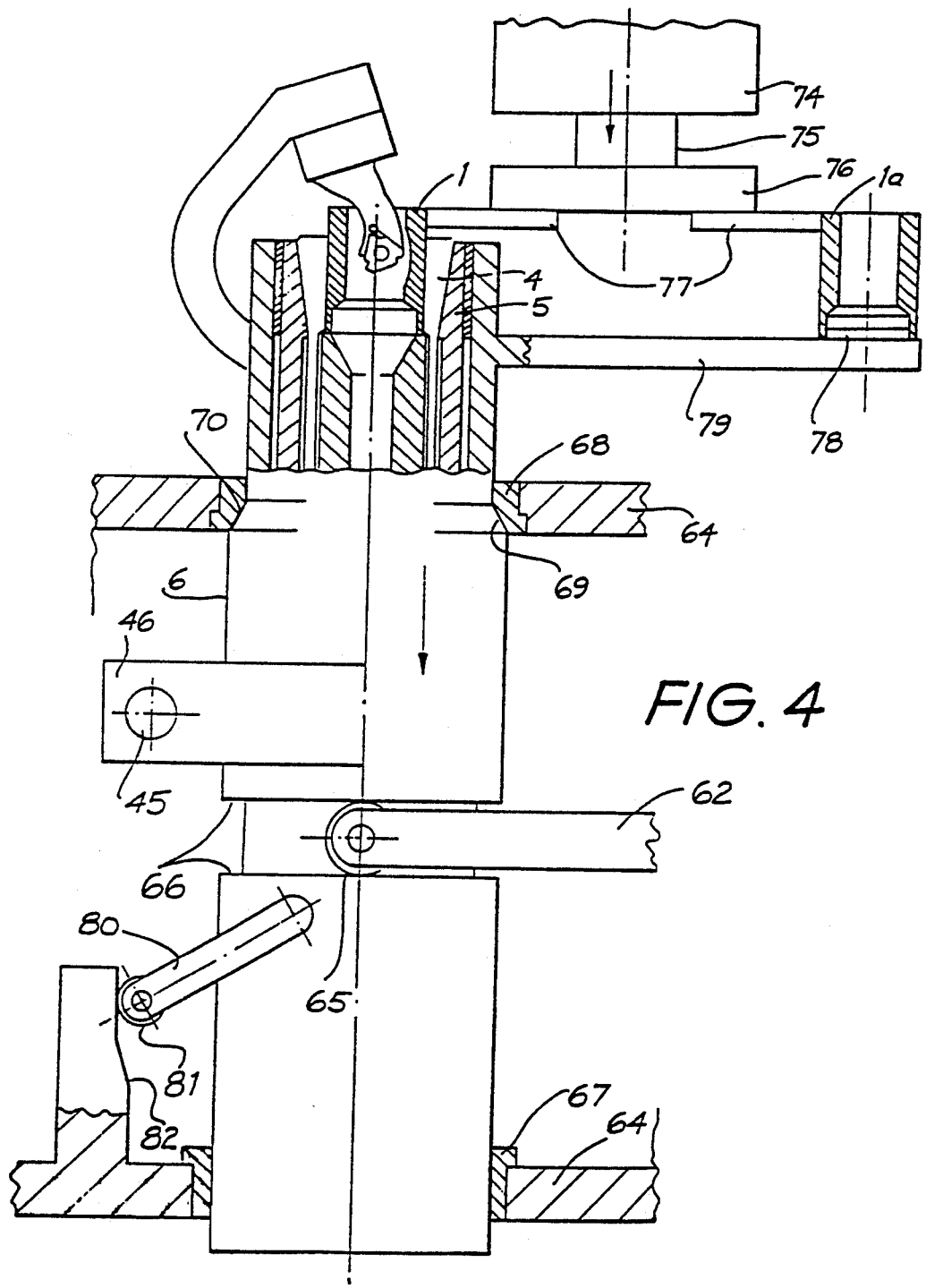
FIG. 4 is a vertical cross section of the sliding work spindle carrier of FIG. 3 during machining of slots in a sleeve.

In the position shown in FIG. 4 grippers 77 are open both during the machining of the slots in sleeve 1 and during the loading of the next sleeve to be machined 1a on loading platform 78.

As the loading cycle commences grippers 77 close on sleeves 1 and 1a, and shaft 75 and sliding work spindle carrier 6 descend in the direction shown in a co-ordinated manner driven respectively by an appropriate cam in loading device 74 (not shown) and cam 60. A short time interval thereafter lever 80 carrying roller 81 engages abutment 82 on machine frame 64 in such a manner as to raise work holding chuck 4 in its conical location in work holding spindle 5 so releasing sleeve 1, such method of release being common practice in the operation of lathe collets.

Figure 5:
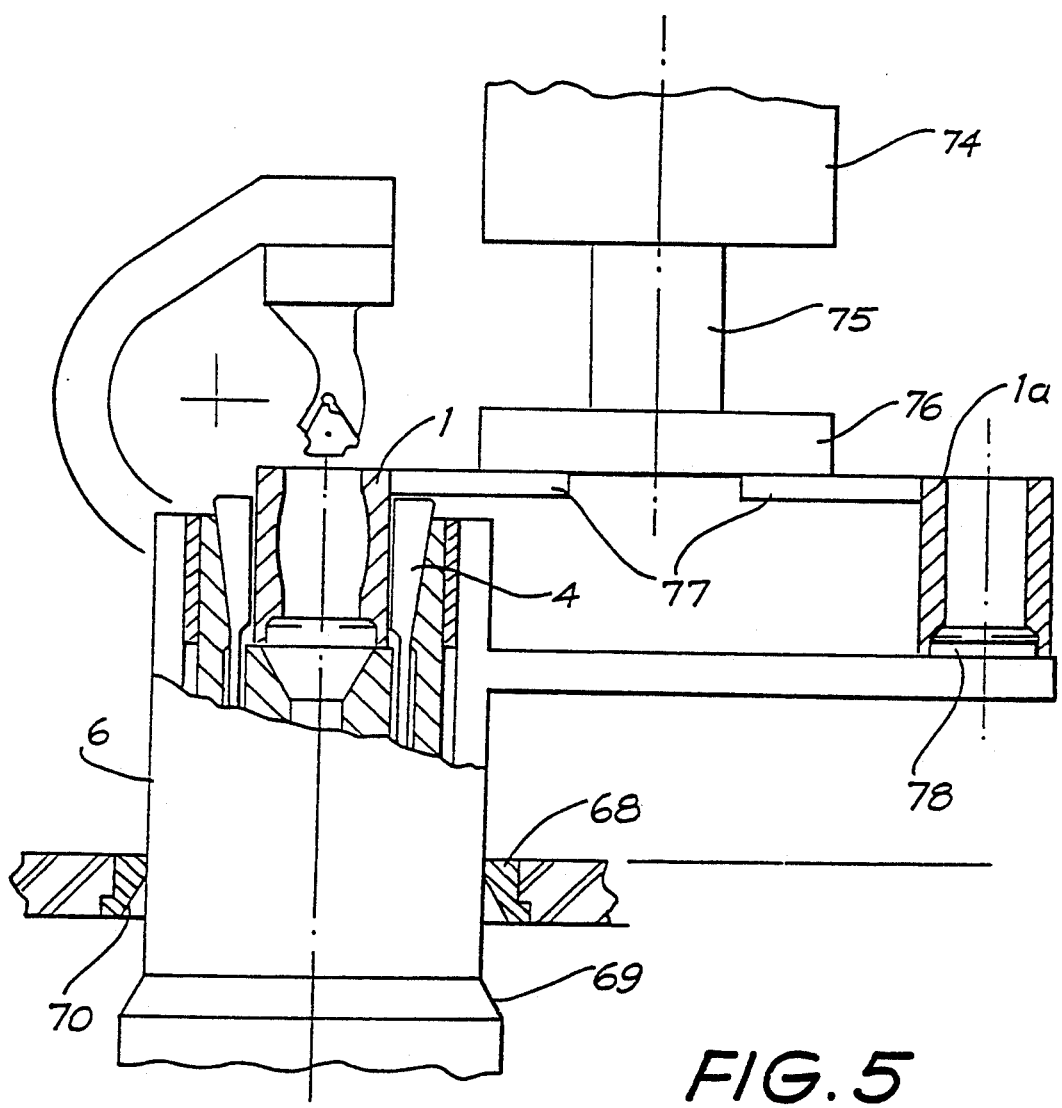
FIG. 5 is a vertical cross section of the sliding work spindle carrier of FIG. 3 with the work holding chuck opened with the sleeve about to be removed.
Figure 6:
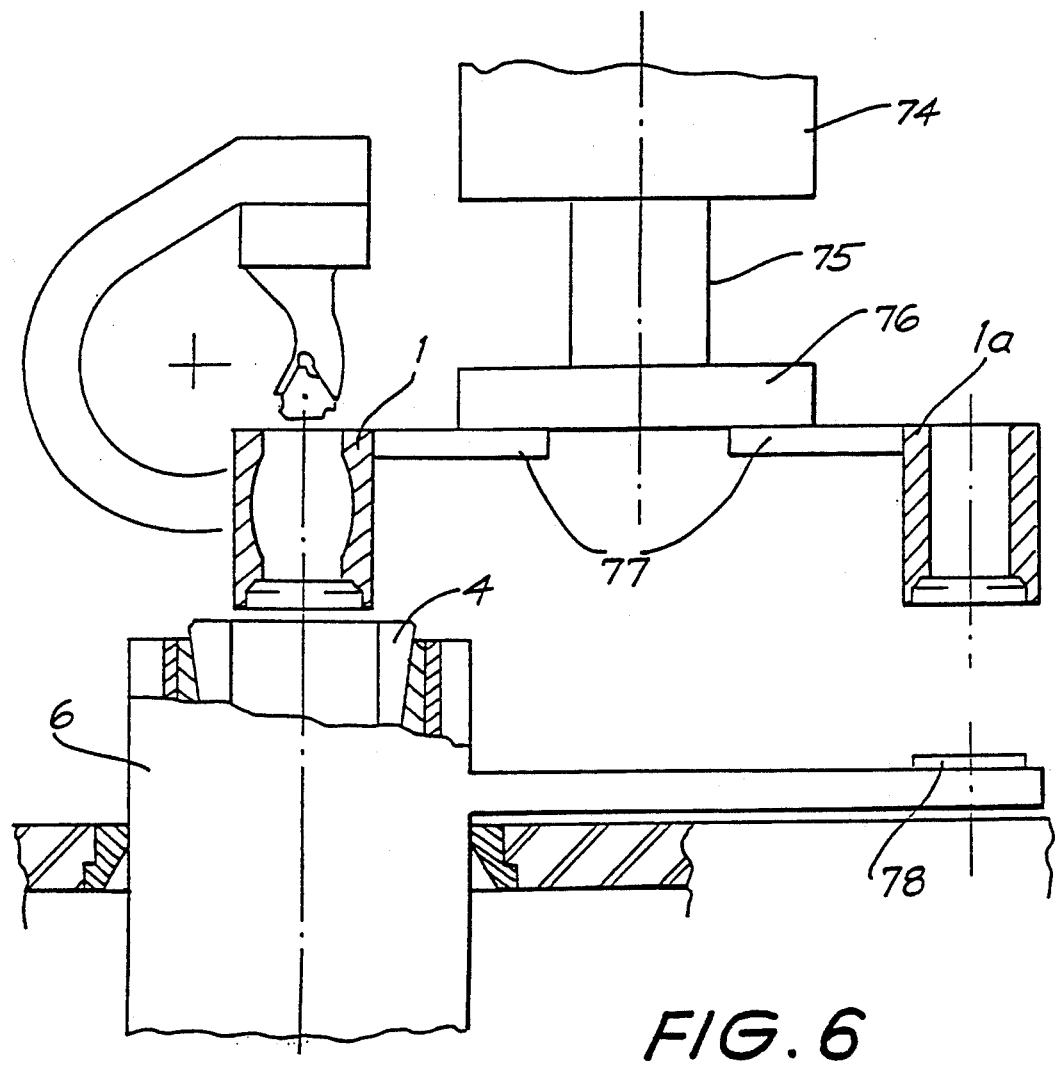
FIG. 6 is a vertical cross section of the sliding work spindle carrier of FIG. 3 with the sleeve removed from the work holding chuck.

FIG. 5 shows the instant when the work holding chuck 4 is open and shaft 75 is arrested in its downward movement while sliding work spindle carrier 6 continues to descend, so removing sleeve 1 from work holding chuck 4 as illustrated in FIG. 6, whereupon shaft 75 and loader arms 76 are rotated one half turn in order to bring unmachined sleeve 1a above work holding chuck 4 and finished machined sleeve 1 above loading platform 78. The sequence of events just described is now performed in reverse order so that sleeve 1a is inserted in work holding chuck 4 and is ready to be machined, and completed sleeve 1 is likewise place on loading platform 78 and may be removed by hand, or by a suitable robot device, to an adjacent conveyor (not illustrated).

During the entire loading operation described, which occupies 2 or 3 seconds, the cutting spindle 12 continues to reciprocate whereas cam 34 and index mechanism 46 are temporarily disabled through the disengagement of clutch member 48 with pinion 39a. Immediately thereafter further rotation of lobed cam 52 causes the loading cycle to be arrested, and clutch member 48 again engages reduction gearing 39 so as to recommence the cutting cycle.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

We claim:

1. A machine for machining blind-ended slots longitudinally disposed within the bore of a sleeve, comprising a work holding spindle indexable about a rotational axis, said spindle incorporating a work holding chuck for holding said sleeve, a cutting tool mounted on a cutting spindle, the axis of said cutting spindle being offset from and at right angles to the rotational axis of said work holding spindle, means of supporting said cutting spindle for angular reciprocation, infeed means to permit said cutting tool to execute a succession of progressively deeper cutting and subsequent return strokes in relation to said bore of said sleeve, whereby after a series of indexations of said work holding spindle, said blind-ended slots are machined in a sleeve characterized in the provision of means slideably supporting said work holding spindle for movement along an axis parallel to said rotational axis of said work holding spindle and, means acting to disable said infeed means after said machining of all said slots is completed, and means to slide said work holding spindle axially relative to said cutting spindle a distance such that said cutting tool is radially and axially clear of said bore.

2. A machine as claimed in claim 1 including gripping means for gripping said sleeve during loading-of said sleeve into said machine prior to said machining and during unloading of said sleeve from said machine after said machining, means to cause said gripping means to grip said sleeve after said cutting tool is radially and axially clear of said bore and means acting to cause said work holding chuck to release said sleeve, said relative axial sliding of said work holding spindle acting to cause said sleeve to be extracted axially from said work holding chuck.

3. A machine as claimed in claim 1 wherein said work holding spindle is journalled for rotation in a sliding work spindle carrier, said sliding work spindle carrier being journalled for axial sliding in the frame of said machine, thereby enabling said work holding spindle to be slideable along an axis parallel to its rotational axis.

4. A machine as claimed in claim 3 having a conical surface on the exterior of said sliding work spindle carrier acting to engage forcibly a corresponding conical surface in said base of said machine during said machining, thereby providing rigid and accurate concentric location of said work holding spindle.

5. A machine as claimed in claim 2 having means for driving said gripping means up and down in synchronism over part of its axial travel with said work holding spindle along an axis parallel to that of said work holding spindle but laterally offset therefrom.

* * * * *

UNITED STATES PATENT AND TRADEMARK OFFICE
CERTIFICATE OF CORRECTION

PATENT NO. : 5,328,309
DATED : July 12, 1994
INVENTOR(S) : Arthur E. BISHOP et al It is certified that error appears in the above-indentified patent and that said Letters Patent is hereby corrected as shown below:

On the title page, Item [22], delete " Filed: Aug. 6, 1993 " and insert -- PCT Filed: October 29, 1991 --.

On the title page, after Item [22], insert the following:

[86]  PCT No.:  PCT/AU91/00500

§ 371 Date:  Aug. 6, 1993

§ 102(e) Date:  Aug. 6, 1993

[87]  PCT Pub. No.:  WO 92/09394

PCT Pub. Date:  Jun. 11, 1992

Signed and Sealed this

Twenty-seventh Day of December, 1994

Attest:

BRUCE LEHMAN

*Attesting Officer*  *Commissioner of Patents and Trademarks*